June 13, 1950 J. PHILLIPS 2,511,413

TELEVISION SYSTEM

Filed Aug. 29, 1947 2 Sheets-Sheet 1

INVENTOR.
JOHN PHILLIPS
BY Carl Miller
ATTORNEY

June 13, 1950 J. PHILLIPS 2,511,413

TELEVISION SYSTEM

Filed Aug. 29, 1947 2 Sheets-Sheet 2

INVENTOR.
JOHN PHILLIPS
BY
Carl Miller
ATTORNEY

Patented June 13, 1950 2,511,413

UNITED STATES PATENT OFFICE 2,511,413

TELEVISION SYSTEM

John Phillips, New York, N. Y.

Application August 29, 1947, Serial No. 771,195

1 Claim. (Cl. 178—5.4)

This invention relates to television systems and more particularly to systems of this character which provide for the transmission of a stereoscopic color image accompanied by binaural sound.

It is an object of the invention to provide a system of this character in which provision is made for photographically recording the transmitted material at the receiving apparatus.

A further object of the invention is to provide a system in which the scanning apparatus comprises a mechanically balanced series of revolving glass discs.

Another object of the invention is to provide means for transmitting the sound and the picture signals simultaneously on the same carrier frequency.

Still another object of the invention is the provision of line and frame synchronizing signals originating in the glass discs which scan the transmitted scene.

Other and further objects will become apparent upon reading the following specification together with the accompanying drawing forming a part hereof.

Figures 1A, 2, 3, 4, 5:
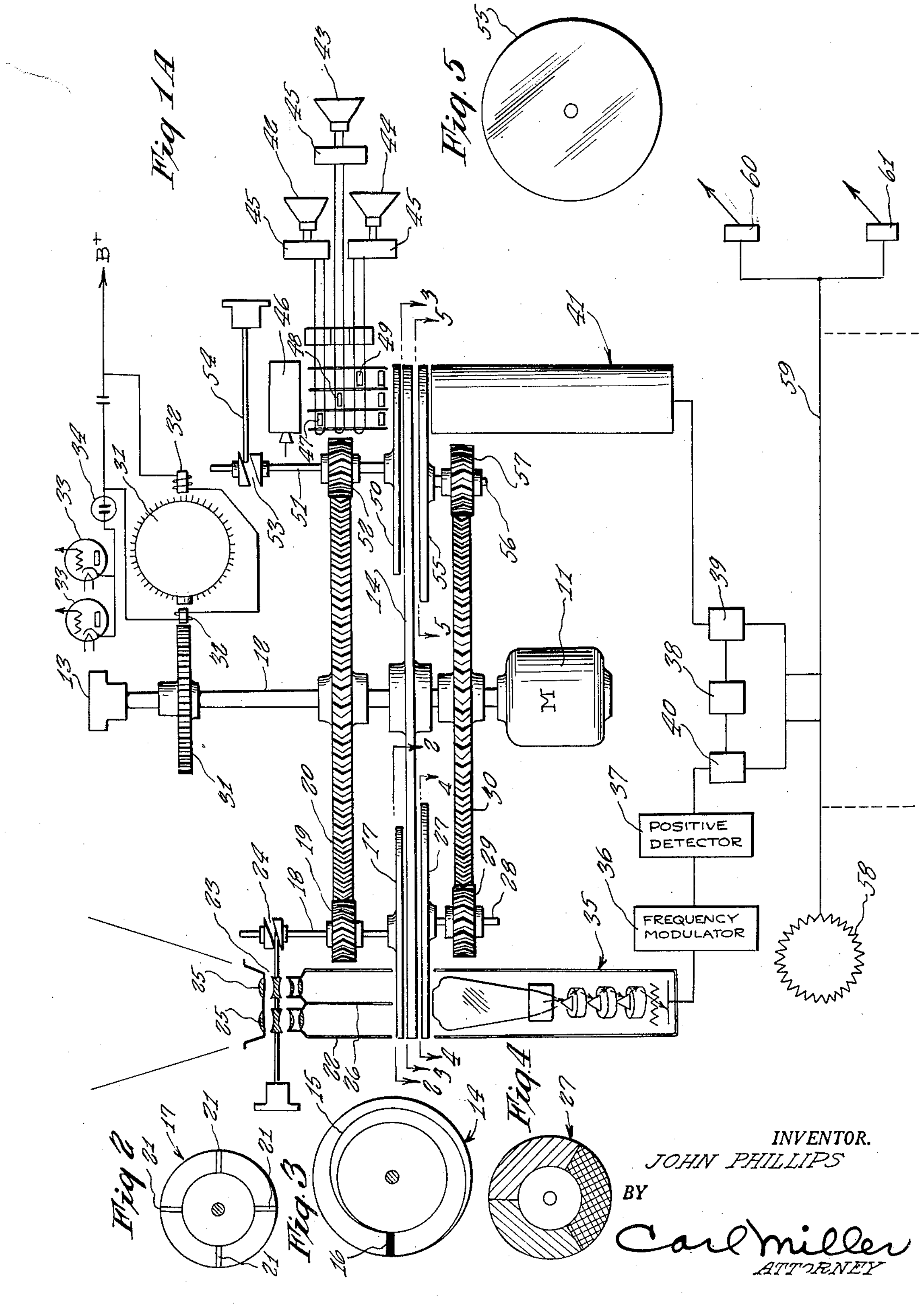
Fig. 1A is a diagrammatic representation of the apparatus at the transmitter.
Fig. 2 shows a disc which is used in the picture scanning.
Fig. 3 shows another scanning disc.
Fig. 4 shows a color disc.
Fig. 5 shows a clear glass disc used for mechanically balancing the system.

Referring to Fig. 1A, a motor 11 is arranged to drive a shaft 12 supported at one end by a bearing 13. An opaque glass disc 14 is carried by shaft 12 and is provided with a spiral transparent scratch 15 with an opaque gap between its ends at 16, as shown in Fig. 3. Disc 14 makes one revolution for each frame of the picture and scratch 15 provides for the vertical scanning of the picture.

A further disc 17 is supported by shaft 18 and is driven by herringbone gear 19 which meshes with herringbone gear 20 carried by shaft 12. As shown in Fig. 2, disc 17 is of glass and is opaque except for the four radially extending transparent lines 21 which are provided for horizontal scanning of the transmitted picture.

A stereoscopic camera 22 is provided with a natural depth lens system comprising moving lenses 23 which are reciprocated by the double cam 24 carried by shaft 18. The rate of reciprocation is such as to vary the focus of the camera with sufficient rapidity to prevent the variation from being visibly noticeable and to give the effect of bringing both the background and foreground of the picture simultaneously into a sharp focus. The objective lenses of the camera are indicated at 25. A partition 26 divides the camera into two compartments and is shown in the diagrammatic representation of Fig. 1A as being perpendicular to its actual arrangement in the apparatus. The partition 26 is so arranged that it actually extends in a radial direction with respect to shafts 12 and 18 and so that it completely blocks each transparent line 21 of disc 17 at the instant when the line passes the partition. The width of the camera is such that there will always be one of the lines 21 in the field and so that one line enters the field immediately as the preceding line leaves the field. In this way there will always be light present except at the instant when a line 21 passes partition 26. This instant gives a momentary indication of complete blackness and indication thus obtained is used for the line synchronizing signal as will be described later.

A color disc 27 is shown provided with three areas and each area provides a colored transparency in accordance with the three secondary colors. The three primary colors may be used, if desired. The color disc intercepts the pencil of light passing through the discs 14 and 17 and is supported by a shaft 28 and is driven by gear 29 which meshes with gear 30 carried by shaft 12. The gear ratios are such that each successive line of the picture is scanned through a different color and by reason of the fact that there are four scanning lines on disc 17 and three color areas on disc 27, the colors in which the various lines are scanned will be continuously changing thereby avoiding any fixed pattern which might be visually noticeable.

Synchronization is obtained by means of a magnetic disc 31 which is provided with a plurality of narrow teeth and a single wide tooth, the disc being carried by shaft 12 and revolving together with vertical scanning disc 14. The single wide tooth corresponds to the opaque framing synchronizing 16 of disc 14. The magnetic synchronizing disc 31 is not used at the transmitter, but forms a part of the receiving apparatus and locks the rotation shaft 12 at the receiving station into synchronism with that of shaft 12 at the transmitting station. At the receiving station, motor 11 is adjusted to tend to maintain synchronism without the aid of disc 31 thereby minimizing the burden to be borne by the disc at the receiving station in maintaining synchronism with the disc at the transmitting station. A diagrammatic representation of disc 31 is shown adjacent to the view of the disc and it will be seen that magnet 32 which acts on the teeth is energized through a gas discharge tube 34 from the cathode follower stages 33 which are associated with the receiving apparatus and which respond to the synchronizing impulses. Definite line and frame synchronizing impulses are thus applied to the successive teeth of magnetic disc 31.

Light from the scene to be transmitted thus passes through three discs, one a vertical scanning disc with a spiral transparent trace, the other a line-scanning disc with four radial transparent lines, and the third a color disc. The light falls on a photoelectric tube 35 which is shown as being of the electron multiplier type which is indicated illustratively as being of the type employing cones and cylinders.

The resulting picture signals pass through a frequency modulator 36 and a positive detector 37. A source of carrier current 38 is associated with combining stage 40 which is arranged to cause modulation only of the positive half waves of the carrier by reason of the action of positive detector 37. Photoelectric tube 41 is similarly arranged and a negative detector (not shown) is provided so that signals originating in tube 41 modulate only the negative half of the carrier wave thus providing two modulations superposed upon the same wave.

The sound transmission system comprises three microphones 42, 43 and 44 which are arranged respectively at the left, center and right of the scene to be transmitted. This arrangement gives full depth effects when the sounds are reproduced by loudspeakers similarly arranged at the receiving station. Three amplifiers 45 are individually associated with the three microphones 42, 43 and 44 and are arranged to amplify the outputs of the respective microphones. The three microphone outputs are independently transmitted to the receiving station so that the depth effects may be realistically reproduced.

A light source 46 is arranged to furnish light to light valves 47, 48 and 49. These valves may be of any desired type such as a pair of mutually perpendicular light polarizing devices one of which is caused to rotate in accordance with the applied audio frequency currents from one of the amplifiers. In such an arrangement the amount of light passing through the mutually perpendicular polarizing devices will be controlled in accordance with the amount of deviation from the mutually perpendicular position of the axes of polarization which in turn will be proportional to the instantaneous amplitude of the audio frequency voltage. In the arrangement shown, valve 47 is controlled by microphone 42, valve 48 is controlled by microphone 43, and valve 49 is controlled by microphone 44.

A disc 50, similar in all respects to disc 17, is mounted on a shaft 51 being driven by gear 52 which meshes with gear 20. Shaft 51 revolves at the same speed as shaft 18. For purposes of mechanical symmetry a double acting cam 53 causes reciprocating motion of a dummy mechanical load 54 which has the same kinetic characteristics as the full depth focusing system operated by double acting cam 24 on shaft 18. Again, for purposes of mechanical symmetry, a clear glass disc 55, as shown in Fig. 5, is mounted on a shaft 56 which is driven by gear 57 which meshes with gear 30 on shaft 12. It will thus be seen that the sound is scanned in substantially the same manner as the picture and that the scanning action separates the three channels for individual transmission.

The modulated signals are applied, either to antenna 58 for radiation, or they may be transmitted by a wire line as indicated at 51 and at the receiving station they will then be applied directly to the detectors 60 and 61.

Figures 1B, 6:
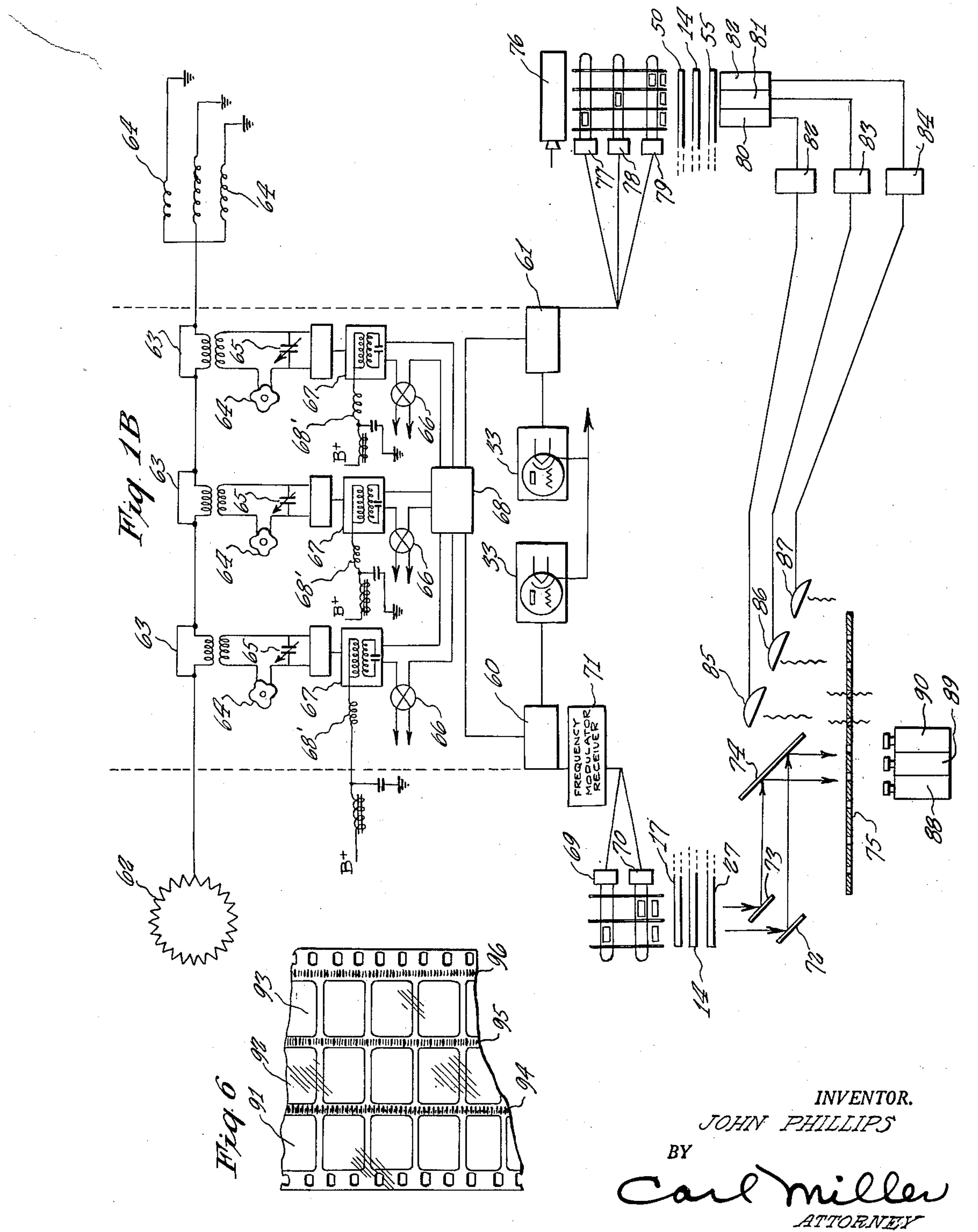
Fig. 1B is a similar representation of the apparatus at the receiver.
Fig. 6 is a fragmentary view of a film used for recording the received programs.

Referring to Fig. 1B, the received signals are picked up by antenna 62 and are applied to a plurality of channel selecting tuners any one of which may be brought into service by opening the appropriate connection 63. Unwanted signals are drained off through a plurality of resonant circuits 64, these being arranged to preserve the desired signals.

Each receiving channel is provided with a tuning knob 64 and a tuner 65 arranged to permit selection of the desired station. Each receiver is provided with the usual volume control and switch 66, and with further selective filter apparatus situated in the intermediate frequency portion of the receiver, the intermediate frequency output being amplified by the common intermediate frequency amplifier 68. The output of amplifier 68 is applied to polarity sensitive detectors 60 and 61. Detector 60 is responsive to the positive half waves of the carrier and these are modulated by the picture signals. Detector 61 is responsive to the negative half waves of the carrier which are modulated by the accompanying sound. Additional selectivity in the intermediate frequency stages is provided by the tuned inductors 68' which may be of the slug tuned type, for example.

The picture signals are applied to light valves 69 and 70 from a frequency modulation receiver 71 which is actuated by the positive half-waves of the signal which carry the picture modulations. The scanning action of discs 14 and 17 is in synchronism with the discs at the transmitting station and accordingly, the stereoscopic picture will be reproduced. Both valves are energized simultaneously and the scanning action places the instantaneous level of illumination at the correct point of the reproduced picture. Light for reproducing the picture is obtained from a source of any desired type, not shown.

The two pictures of the stereoscopic pair are projected by means of mirrors 72, 73 and 74 upon a perforated projection screen 75. For viewing, the left and right eye images may be projected in superposed relationship upon the screen and separated by individual polarization of the two projected images at mutually perpendicular axes with subsequent separation of the images by means of correspondingly polarized spectacles worn by the observes.

The sound is reproduced by means of light valves 77, 78 and 79 which are simultaneously energized from detector 61 together with such amplifying apparatus as may be required. The valves thus respond to the negative half waves of the carrier current and produce an intensity of illumination in accordance with the instantaneous amplitude of the sound modulations. The scanning action of discs 50 and 14 separates the three sound transmissions so that they be individually reproduced by photocells 80, 81 and 82. In this connection, it should be noted that the scanning action takes place at a super-audible rate to avoid the introduction into the received program of disturbances resulting from the scanning.

The sound is amplified separately by amplifiers 82, 83 and 84 and reproduced by loudspeakers 85, 86 and 87 which are located in relative positions corresponding to those of their respective microphones at the transmitting station.

The effect at the receiving station is that of three-dimensional stereoscopic reproduction of the picture signals in color accompanied by sound effects which are also three dimensional in effect.

For recording the received program, a group of three steroscopic cameras 88, 89 and 90 are provided, each camera being provided with suitable filters to cause it to be responsive to a single color of the three colors used in the transmission system. The stereoscopic images are photographed in side by side relationship on the film, and a separate sound track is provided for each of the three sound channels. The record thus produced is shown in Fig. 6 in which, considering the three secondary colors, a black and white image corresponding to the orange will be recorded along the series of frames 91, purple at 92 and green at 93. The sound tracks 94, 95 and 96 correspond to the three sound channels of the transmitted signals, namely right, center and left. Each of the frames provides two stereoscopically related images placed side by side. The film, at the time of projection will have suitable corresponding color filter interposed in each of the three image paths so that the black and white intensities will be recombined to give the original color effect. The stereoscopic effect can be reproduced by projecting the images as previously described, and the sound from each of the three sound tracks will be separately reproduced by three loudspeakers positioned in accordance with the corresponding sound tracks.

In my television set the main disc with its spiral slit represents a continuous picture every revolution, that is, light from the entire picture passes thru the slit every revolution which the Nipkow disc was unable to do. In addition, this continuous picture is scanned by slots so placed as to provide a continuous lens. These two continuous slits are the basis of my invention. A continuous picture scanned by a continuous lens.

The slightest amount of light passing thru the lens and various discs are focused by a mirror glass funnel upon the cone of an electron multiplier, and thru a system of electron emitting rods and cones of gradually increasing voltage so that the multiplier voltage, striking the plate produces a strong signal which is frequency modulated. Modulated polarized light from three sound channels shines upon the various discs at the sound end, but as the slots are spaced the width of the three sound channels the slot picks up the light from the three sound channels consecutively, and one by one they shine their light thru the slot to be focused upon a duplicate electron multiplier, which produces a strong signal and one by one they consecutively are multiplied over one line.

The frequency modulation of the picture divides, one side being amplified normally, the other side goes to a modulating oscillator which is impressed upon the audio amplification, the picture frequency, modulation being amplitude modulated by the audio amplification creating a new frequency. Audio modulated frequency modulation or AMFM, which combined frequency enjoys some of the advantages of frequency modulation and being amplified normally is then combined in a transmitting tube, which intensifies the amplitude modulation component, so that when broadcast it can be easily separated in the receiver, both individually amplified, the picture signals actuating the polaroid mechanism, the light from which passes thru various discs and lens to be projected upon a magnifying mirror, such as you find in a printer for photographers. It is then reflected upon a screen so constructed to allow both sight and sound to penetrate. As third dimension must be seen thru the eyes, polaroid glasses must be worn, unless a person wants to get crosseyed looking at two pictures at once on this screen. So also on the sound and picture recording machine, where colors are separated, strong colors must be used, which leaves out primary colors. Blue is extremely weak and red not very strong when projected thru a black and white positive film. My colors are secondary using purple for blue and orange for yellow, to average the color strength projected to the screen.

I have shown what I believe to be the best embodiment of my invention. I do not wish, however, to be limited to the embodiment shown but what I wish to cover by Letters Patent is set forth in the appended claim.

Having thus set forth and disclosed the nature of my invention, what is claimed is:

A scanning arrangement for television apparatus comprising an electric motor having a shaft extending therefrom, an opaque glass disc carried by such shaft, said disc having a spiral transparent scratch with an opaque gap between its ends, said motor driving said disc at one revolution for each frame of a picture for the vertical scanning thereof, a second shaft spaced from the motor shaft, large gears axially spaced from one another and connected to the motor shaft, a small pinion gear connected to the second shaft and meshing with one of the large gears of the motor shaft, a third shaft having a small gear and meshing with the other large gear of the motor shaft to be driven by the same, an opaque disc connected to one separate shaft to be driven by the same and lying to one side of the opaque glass disc on the motor driven shaft, said second mentioned opaque disc having 4 radially extending transparent lines for the horizontal scanning of the transmitted picture, a color disc connected to the second separate shaft and located at the opposite side of the main opaque disc driven by the motor shaft, said color disc having three different colored areas, the gear ratios of the gears being such that each successive line of the picture is scanned through a different color, a stereoscopic camera disposed to one side of the disc fixed to the first mentioned separable shaft, said camera having a lens system including moving lenses and means connecting said moving lenses to said first separable shaft to cause the movement of the same and to reciprocate them to vary the focus of the camera with sufficient rapidity to prevent the variation from being visibly noticeable and to give the effect of bringing both the background and foreground of the picture simultaneously into a sharp focus, said camera having a partition providing two compartments, the width of the camera being such that there is always one of the lines of the second mentioned disc having the radially extending lines in the field of the camera, a photoelectric tube of the electron multiplier type having cones and cylinders, said tube being disposed at the opposite side of the disc from the camera lenses.

JOHN PHILLIPS.

REFERENCES CITED

The following references are of record in the file of this patent:

UNITED STATES PATENTS

| Number | Name | Date |
|---|---|---|
| 1,769,907 | DeForest | July 1, 1930 |
| 1,774,348 | Barnes | Aug. 26, 1930 |
| 2,109,540 | Leishman | Mar. 1, 1938 |
| 2,109,627 | Finch | Mar. 1, 1938 |
| 2,165,168 | Hardy | July 4, 1939 |
| 2,236,501 | Goldsmith | Apr. 1, 1941 |
| 2,310,197 | Hansell | Feb. 2, 1943 |
| 2,415,981 | Wolff | Feb. 18, 1947 |